US010081686B2

United States Patent
Resconi et al.

(10) Patent No.: US 10,081,686 B2
(45) Date of Patent: Sep. 25, 2018

(54) PROCESS FOR THE PREPARATION OF COPOLYMERS OF PROPYLENE

(71) Applicant: BOREALIS AG, Vienna (AT)

(72) Inventors: Luigi Resconi, Ferrara (IT); Wilfried Töltsch, Marchtrenk (AT); Jingbo Wang, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/510,040

(22) PCT Filed: Sep. 11, 2015

(86) PCT No.: PCT/EP2015/070891
§ 371 (c)(1),
(2) Date: Mar. 9, 2017

(87) PCT Pub. No.: WO2016/038211
PCT Pub. Date: Mar. 17, 2016

(65) Prior Publication Data
US 2017/0247480 A1    Aug. 31, 2017

(30) Foreign Application Priority Data

Sep. 12, 2014  (EP) .................................... 14184637

(51) Int. Cl.
*C08F 4/00*   (2006.01)
*C08F 4/06*   (2006.01)
(Continued)

(52) U.S. Cl.
CPC ............... *C08F 4/16* (2013.01); *B01J 35/026* (2013.01); *C08F 210/02* (2013.01);
(Continued)

(58) Field of Classification Search
CPC ........ C08F 4/16; C08F 210/02; C08F 210/06; C08F 2500/17; C08F 2500/10; B01J 35/026
(Continued)

(56) References Cited

U.S. PATENT DOCUMENTS 5,753,773 A    5/1998   Langhauser et al.
7,122,498 B2   10/2006  Hart et al.
(Continued)

FOREIGN PATENT DOCUMENTS

EP    0703932    3/1996
EP    1448578    8/2004
(Continued)

OTHER PUBLICATIONS

Elder et al., "Synthesis and performance of ansa-metallocene catalysts with substituted heterocyclic and indenyl ligands," Kinetics and Catalysts, 2006, 47:192-197.
(Continued)

*Primary Examiner* — William K Cheung
(74) *Attorney, Agent, or Firm* — Gardner Groff Greenwald & Villanueva, PC

(57) ABSTRACT

A process for the preparation of a copolymer of propylene and ethylene comprising polymerizing propylene and ethylene in the gas phase in the presence of a solid particulate catalyst free from an external carrier comprising: (i) a symmetrical complex of formula (I), wherein M is zirconium or hafnium; each X is a sigma ligand; L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C$_1$-C$_{20}$-alkyl, tri(C$_1$-C$_{20}$-alkyl)silyl, C$_6$-C$_{20}$-aryl, C$_7$-C$_{20}$-arylalkyl or C$_7$-C$_{20}$-alkylaryl; R$^2$ is a C$_1$-C$_{20}$ hydrocarbyl radical; m is 2 to 5; R$^9$ is
(Continued)

a H or $C_1$-$C_{20}$ hydrocarbyl radical; $R^7$ is a hydrogen atom or a $C_{1-10}$ hydrocarbyl radical; n is 0 to 3; $R^1$ is a $C_1$-$C_{20}$ hydrocarbyl radical and optionally two adjacent $R^1$ groups taken together can form a further mono or multicyclic ring condensed to Ph ring optionally substituted by one or two groups $R^4$; and $R^4$ is a $C_1$-$C_{10}$ alkyl radical; and (ii) a cocatalyst, preferably comprising an organometallic compound of a Group 13 metal; wherein the xylene soluble fraction of the propylene ethylene copolymer has an ethylene content of at least 10 wt % and an intrinsic viscosity of at least 1.2 dl/g.

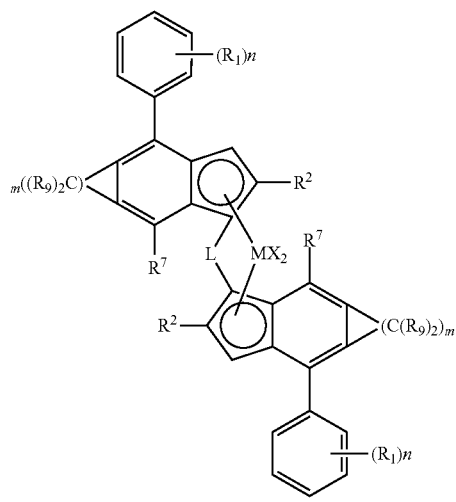

(I)

18 Claims, 4 Drawing Sheets

(51) Int. Cl.

| | | |
|---|---|---|
| C08F 32/00 | (2006.01) | |
| C08F 4/16 | (2006.01) | |
| C08F 210/02 | (2006.01) | |
| C08F 210/06 | (2006.01) | |
| B01J 35/02 | (2006.01) | |

(52) U.S. Cl.
CPC ........ *C08F 210/06* (2013.01); *C08F 2500/10* (2013.01); *C08F 2500/17* (2013.01)

(58) Field of Classification Search
USPC .......................................... 526/348, 90, 154
See application file for complete search history.

(56) References Cited

U.S. PATENT DOCUMENTS

| | | |
|---|---|---|
| 7,842,764 B2 | 11/2010 | Nifant'ev et al. |
| 2013/0197153 A1 | 8/2013 | Kheirandish et al. |

FOREIGN PATENT DOCUMENTS

| | | |
|---|---|---|
| EP | 1481997 | 12/2004 |
| EP | 1511803 | 9/2007 |
| EP | 2053086 | 4/2009 |
| EP | 2072546 | 6/2009 |
| EP | 2402354 | 1/2012 |
| EP | 2 562 215 A1 * | 2/2013 |
| EP | 2829558 | 1/2015 |
| WO | 2003051934 | 6/2003 |
| WO | 2004106351 | 12/2004 |
| WO | 2005058916 | 6/2005 |
| WO | 2005105863 | 11/2005 |
| WO | 2006097497 | 9/2006 |
| WO | 2007116034 | 10/2007 |
| WO | 2009054832 | 4/2009 |
| WO | 2009077032 | 6/2009 |
| WO | 2009077034 | 6/2009 |
| WO | 2010052260 | 5/2010 |
| WO | 2010052263 | 5/2010 |
| WO | 2010052264 | 5/2010 |
| WO | 2011050926 | 5/2011 |
| WO | 2011050963 | 5/2011 |
| WO | 2011076618 | 6/2011 |
| WO | 2011135004 | 11/2011 |
| WO | 2011135005 | 11/2011 |
| WO | 2012028252 | 3/2012 |
| WO | 2012084961 | 6/2012 |
| WO | 2013007650 | 1/2013 |
| WO | 2013007664 | 1/2013 |
| WO | 2016038210 | 3/2016 |

OTHER PUBLICATIONS

Nifant'ev et al., "Asymmetric ansa-zirconocenes containing a 2-methyl-4-aryltetrahydroindacene fragment: synthesis, structure, and catalytic activity in propylene polymerization and copolymerization," Organometallics, 2011, 30:5744-5752.
International Search Report and Written Opinion for PCT/EP2015/070891 dated Dec. 14, 2015.

* cited by examiner

Figure 3a -□- Inventive PI-1-1; -○- Comparison PC-2-4

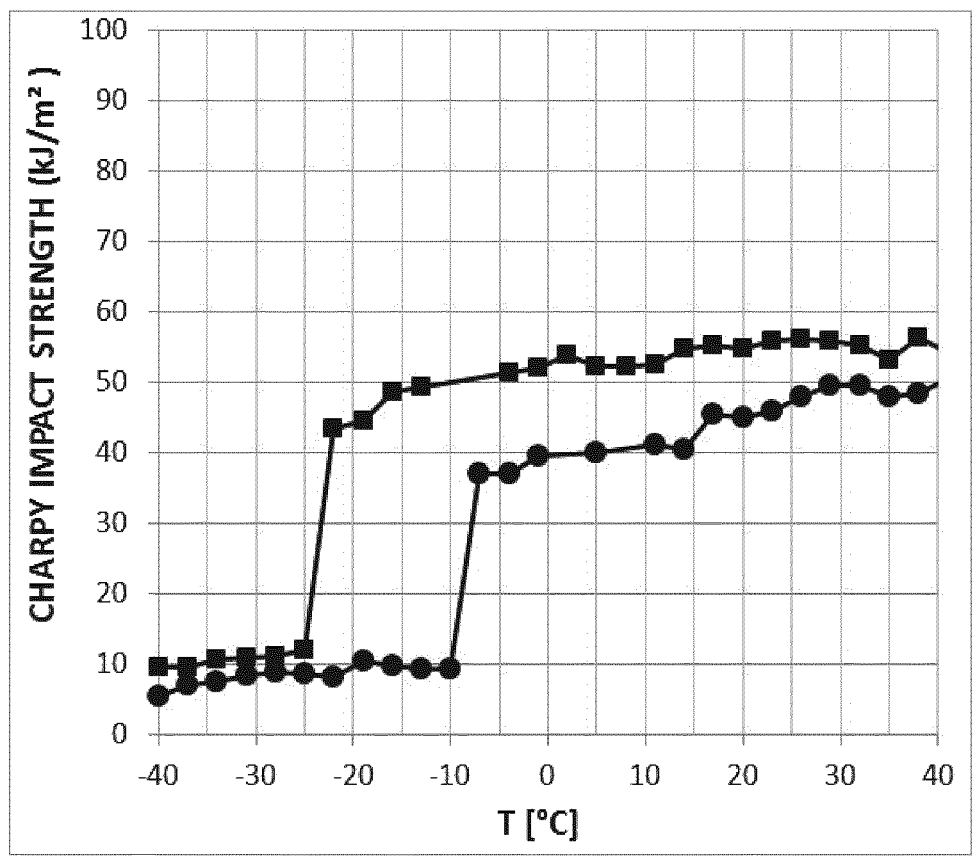
Figure 3b -■- Inventive PI-1-2; -●- Comparison PC-2-2
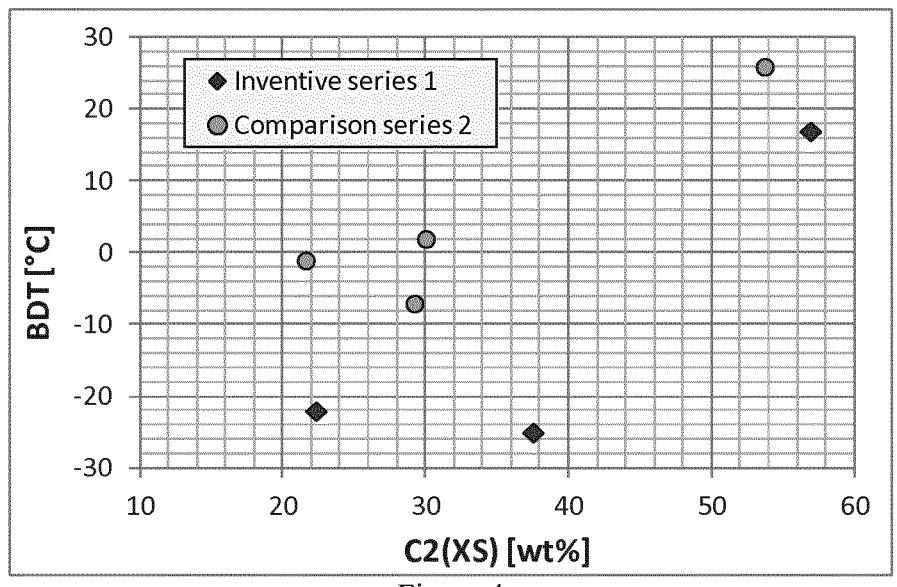
Figure 4

PROCESS FOR THE PREPARATION OF COPOLYMERS OF PROPYLENE

This application is a § 371 National Stage Application of PCT International Application No. PCT/EP2015/070891 filed Sept. 11, 2015, claiming priority of EP Application No. 14184637.8, filed Sept. 12, 2014, the entire contents of each are incorporated by reference.

This invention relates to a process for the polymerisation of propylene and ethylene using a bridged bis indenyl catalyst. In particular, the invention relates to the use of catalysts which comprise certain bridged bis indenyl complexes in solid form but free of an external carrier to polymerise ethylene and propylene in a multistep process including a gas phase polymerisation to form copolymers with high ethylene contents and with high catalyst activity in the gas phase.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

These metallocenes can be used in solution polymerisation but results of such polymerisations have generally been poor. These metallocenes are therefore conventional supported on a carrier such as silica. Research has found that heterogeneous catalysis (in which the catalyst particles do not dissolve in the reaction medium) gives rise to better polymer products than homogeneous catalysis (in solution). The use therefore of a support is common place. Despite several years of development of this catalyst technology, there is still room for improved activity, and improved polymer particle formation.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo-transition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well.

Although a lot of work has been done in the field of metallocene catalysts, both with conventional supported catalysts as well with solid catalysts prepared according to the principles as described in said WO03/051934, there still remain some problems, which relate especially to the productivity or activity of the catalysts. The productivity or activity has been found to be relatively low, especially when polymers of low melt index (MI) (i.e. high molecular weight, $M_w$) are produced. This problem is exacerbated when the target polymer is a propylene and ethylene copolymer.

There remains a need therefore to find catalysts for olefin polymerisation, which are able to produce polymers with desired properties and which have high activity and/or productivity. Further, it is highly desired in many polymer applications that inorganic residues, e.g. silica residues, in the final product are reduced as much as possible.

As a consequence, the inventors set out to develop a catalyst having a superior polymerisation behaviour than the above mentioned polymerisation catalyst systems regarding one or more of the following characteristics:
- improved activity in producing propylene ethylene copolymers in gas phase;
- obtaining propylene ethylene copolymers with high Mw in gas phase with comonomer contents more than 10 wt-%;
- improved low temperature impact strength/stiffness balance.

The present inventors have now found that a certain class of olefin polymerisation catalysts are able to solve the problems disclosed above. The invention combines known supporting techniques using the catalyst emulsion/solidification techniques of WO03/051934 with a specific group of metallocene complexes based on a bis-indenyl structure in which the 2, 4, 5 and 6-positions of the indenyl ring must carry a non hydrogen group. The 2-position is preferably linear or branched alkyl. The 5/6-positions carry a ring. This combination surprisingly results in catalysts having high activity in the context of multistep polymerisation processes comprising at least one gas phase reactor for producing propylene and ethylene and enables the formation of propylene copolymers having high ethylene contents and high Mw (e.g. as measured via intrinsic viscosity) at commercially relevant polymerisation temperatures.

The inventors have also found that the process described herein is ideal for the production of high ethylene content heterophasic propylene/ethylene copolymers with increased molecular weight.

As we note below, the catalysts used in this invention are not themselves new and other similar catalysts are known. WO2009/054832 discloses conventionally supported metallocene catalysts which are branched at the 2-position of the cyclopentadienyl ring in at least one of the ligands making up the catalyst.

WO2007/116034 describes metallocene compounds substituted in the 2-position by a linear alkyl group. In particular the compound dimethylsilyl(2-methyl-4-phenyl-5-methoxy-6-tertbutylinden-1-yl dichlorozirconium is described which carries a methyl group at the 2-position.

WO2006/097497 describes certain symmetrical metallocenes based on tricyclic ring systems (tetrahydroindacenyl).

WO2011/135004 and WO2011/135005 describe rac-Me$_2$Si(2-Me-4-Ph-5-OMe-6-tBuInd)$_2$ZrCl$_2$ but only in the context of propylene homopolymerization.

WO2011/076780 describes some of the catalysts of the invention and shows that they can be used in propylene homopolymerisation.

WO2012/001052 describes some of the catalysts of the invention and shows that they can be used in propylene homopolymerisation.

However, the use of the catalysts of the invention explicitly in gas phase polymerisation for the production of the propylene ethylene copolymers having high ethylene content in the xylene soluble fraction is not known.

It has now surprisingly been found that the particular complexes described below in solid form but free from external carrier can be used in propylene ethylene polymerisation in the gas phase. The catalysts comprehensively outperform known catalysts prepared according to the method of WO03/051934 and offer useful polymers with very high ethylene content at high Mw and useful catalyst activity/productivity, especially in the gas phase.

Polymers made from these catalysts have excellent impact strength and a good balance of stiffness/impact strength. Moreover, the catalysts can be used to prepare heterophasic polypropylene copolymers in which the matrix component being propylene homopolymer or random propylene-ethylene copolymer with ethylene content at most 4 wt-%, preferably at most 2 wt-%, has a high melting point and high crystallinity.

These catalysts operate well at commercially interesting polymerisation temperatures such as 60° C. or more. Moreover, we achieve these aims with symmetrical catalysts which are therefore easier to make than other prior art asymmetric metallocenes which have complex syntheses rendering the metallocenes expensive.

SUMMARY OF INVENTION

Thus, viewed from one aspect the invention provides a process for the preparation of a copolymer of propylene and ethylene comprising polymerising propylene and ethylene in the gas phase in the presence of a solid particulate catalyst free from an external carrier comprising:

(i) a symmetrical complex of formula (I):

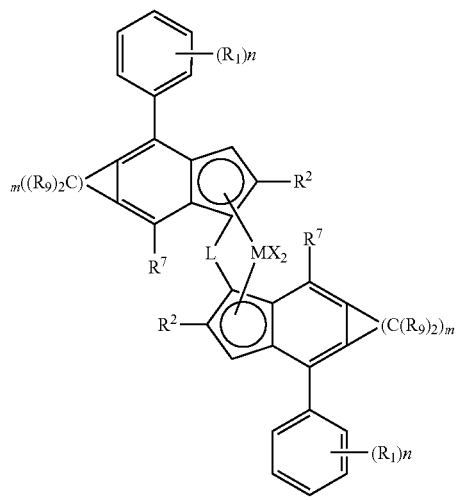

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;
R$^2$ is a C1-C20 hydrocarbyl radical;
m is 2 to 5;
each R$^9$ is a H or C1-C20 hydrocarbyl radical;
R$^7$ is a hydrogen atom or a C$_{1-10}$-hydrocarbyl radical;
n is 0 to 3;
R$^1$ is a C1-C20 hydrocarbyl radical and optionally two adjacent R$^1$ groups taken together can form a further mono or multicyclic ring condensed to Ph ring optionally substituted by one or two groups R$^4$; and
R$^4$ is a C1-C10 alkyl radical;
and (ii) a cocatalyst, preferably comprising an organometallic compound of a Group 13 metal;
wherein the xylene soluble fraction of the propylene ethylene copolymer has an ethylene content of at least 10 wt % and a intrinsic viscosity of at least 1.2 dl/g.

The catalyst used in the process of the invention is in solid particulate form free from an external carrier. Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Viewed from another aspect therefore, the invention provides a process for the preparation of an propylene ethylene copolymer has hereinbefore defined in which the catalyst as hereinbefore defined is prepared by obtaining a complex of formula (I) and a cocatalyst as hereinbefore described;

forming a liquid/liquid emulsion system, which comprises a solution of catalyst components (i) and (ii) dispersed in a solvent, and solidifying said dispersed droplets to form solid particles.

Ideally the propylene ethylene copolymer is a random propylene copolymer or heterophasic propylene copolymer. Ideally, the gas phase polymerisation process takes place at a temperature of at least 60° C. One stage of the process may take place in bulk.

Viewed from another aspect the invention provides a process for the preparation of a copolymer of propylene and ethylene comprising:

(A) polymerising propylene and optionally ethylene in bulk to form a propylene homopolymer or propylene-ethylene random copolymer component in the presence of a solid particulate catalyst free from an external carrier comprising:

(i) a symmetrical complex of formula (I):

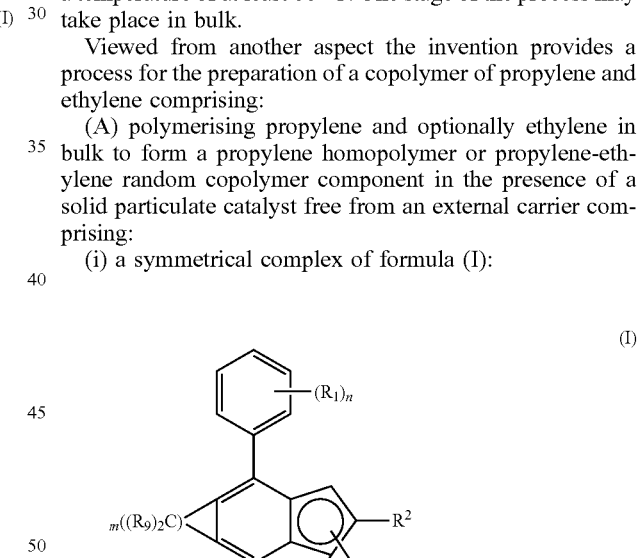

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

$R^2$ is a C1-C20 hydrocarbyl radical;

m is 2 to 5;

each $R^9$ is a H or C1-C20 hydrocarbyl radical;

$R^7$ is a hydrogen atom or a $C_{1-10}$-hydrocarbyl radical;

n is 0 to 3;

$R^1$ is a C1-C20 hydrocarbyl radical and optionally two adjacent $R^1$ groups taken together can form a further mono or multicyclic ring condensed to Ph ring optionally substituted by one or two groups $R^4$; and $R^4$ is a C1-C10 alkyl radical and (ii) a cocatalyst, preferably comprising an organometallic compound of a Group 13 metal;

(B) polymerising propylene and ethylene in the gas phase in the presence of the polymer prepared in step (A) and in the presence of the catalyst from step (A) so as to form a propylene ethylene copolymer component;

wherein the xylene soluble fraction of the copolymer of propylene and ethylene (as a whole) has an ethylene content of at least 10 wt % and a intrinsic viscosity of at least 1.2 dl/g.

Viewed from another aspect the invention provides a process for the preparation of a copolymer of propylene and ethylene comprising:

(A) polymerising propylene and optionally ethylene in bulk to form a propylene homopolymer or propylene random copolymer component in the presence of a solid particulate catalyst free from an external carrier comprising:

(i) a symmetrical complex of formula (I) as herein defined:

and (ii) a cocatalyst, preferably comprising an organometallic compound of a Group 13 metal;

(B) polymerising propylene and optionally ethylene in the gas phase in the presence of the polymer prepared in step (A) and in the presence of the catalyst from step (A) so as to form a propylene homopolymer or propylene ethylene copolymer component;

(C) polymerising propylene and ethylene in a second gas phase step in the presence of the polymer prepared in step (B) and in the presence of the catalyst from step (B) so as to form a propylene ethylene copolymer component;

wherein the xylene soluble fraction of the copolymer of propylene and ethylene (as a whole) has an ethylene content of at least 10 wt % and a intrinsic viscosity of at least 1.2 dl/g.

Definitions

Throughout the description the following definitions are employed.

By free from an external carrier is meant that the catalyst does not contain an external support, such as an inorganic support, for example, silica or alumina, or an organic polymeric support material.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

The term tertiary group such as tertiary alkyl means that a carbon atom within that group is not bound to a hydrogen atom and hence the carbon in question is bound to four other carbon atoms (and is thus quaternary). Thus tert-butyl contains a tertiary carbon atom or a 1-alkylcycloalkyl group.

Catalyst activity is defined in this application to be the amount of polymer produced/g catalyst/h. The term productivity is also sometimes used to indicate the catalyst activity although herein it designates the amount of polymer produced per unit weight of catalyst.

DETAILED DESCRIPTION OF INVENTION

The complexes and hence catalysts of the invention are based on formula (I) as hereinbefore defined which, inter alia, combines the use of the indenyl ring structure with non H substituents at the 2, 4, 5 and 6-positions.

The two multicyclic ligands making up the complex of formula (I) are identical and hence the complex of formula (I) is symmetrical (C2 symmetry). The complexes of the invention may be in their meso or racemic forms (or a mixture thereof). Preferably, the racemic (rac) form is used.

M is preferably Zr or Hf, especially Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical. R is preferably C1-10 alkyl or C6-20 aryl. R is more preferably a $C_{1-6}$ alkyl, phenyl or benzyl group.

Most preferably each X is independently a hydrogen atom, a halogen atom, $C_{1-6}$-alkoxy group or an R group, e.g. preferably a $C_{1-6}$-alkyl, phenyl or benzyl group. Most preferably X is chlorine or a methyl radical. Preferably both X groups are the same.

L is preferably a bridge comprising ethylene or methylene or is a bridge based on a heteroatom, such as silicon or, germanium, e.g. —$SiR^8_2$—, wherein each $R^8$ is independently C1-C20-alkyl, C6-C20-aryl or tri(C1-C20-alkyl)silyl-residue, such as trimethylsilyl. More preferably $R^8$ is a $C_{1-8}$ alkyl, e.g. $C_{1-6}$-alkyl, especially methyl. Most preferably, L is a dimethylsilyl, diethylsilyl or ethylene bridge.

$R^2$ is preferably a linear or branched C1-20 alkyl or C4-10 alkylcycloalkyl, preferably C1-8 alkyl. Preferably $R^2$ is linear $C_{1-6}$ alkyl, especially methyl, or is a C4-20 hydrocarbyl group branched β to the cyclopentadienyl ring. By branched β to the cyclopentadienyl ring is meant that the second atom from the cyclopentadienyl ring must be tertiary or quaternary, preferably tertiary, i.e. has one H group and three non H groups. The branched $R^2$ radical preferably comprises at least 4 carbon atoms in the chain. It will also be appreciated that where a cyclic group such as a cycloalkyl group, or aryl group is present at the atom β to the cyclopentadienyl then there is a branch present.

Preferably $R^2$ is methyl or a C4-C12 hydrocarbyl branched β to the cyclopentadienyl ring.

Radical $R^2$ can also be a $CH_2$-cycloalkyl group having 4 to 12 carbon atoms or a $CH_2$-aryl radical containing from 7 to 11 carbon atoms.

In a preferred embodiment, $R^2$ is the group $—CH_2—R^{2'}$, i.e. the link to the cyclopentadienyl ring is via a methylene group and $R^{2'}$ represents the remainder of the $R^2$ group, e.g. a C3-19 hydrocarbyl group.

In particular, $R^{2'}$ represents a $C_{3-7}$-cycloalkyl group (optionally substituted by $C_{1-6}$-alkyl), a $C_{6-10}$-aryl group, especially phenyl or tolyl, or an $C_{3-8}$-alkyl group (such that the beta position to the cyclopentadienyl is branched).

In a further preferred embodiment therefore, $R^2$ is a group $CH_2—C(R_3)_{3-q}(H)_q$ wherein each $R_3$ is a $C_{1-6}$-alkyl group or together two $R_3$ groups form a $C_{3-7}$-cycloalkyl ring. The subscript q can be 1 or 0.

$R^2$ is ideally methyl or an isobutyl, $—CH_2C(Me)_3$ or $—CH_2CH(Me)(Et)$ group. Alternatively, $R^2$ is $—CH_2C_6H_{11}$ where $C_6H_{11}$ is cyclohexyl, $CH_2C_6H_{11}(Me)$ where the cyclohexyl is substituted by methyl or $—CH_2C_6H_5$ (benzyl).

$R^7$ is preferably a hydrogen atom or $C_{1-6}$ alkyl such as methyl, ethyl, propyl or isopropyl group, most preferably methyl or especially hydrogen.

The subscript n can be zero or 1 to 3. The phenyl ring is thus unsubstituted or carries one to three substituents. The optional substituent on any Ph group is $R^1$. If present, there should be 1 to 3 $R^1$ groups, preferably one or two $R^1$ groups.

Preferably $R^1$ is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical. Preferably $R^1$ is a linear or branched, cyclic or acyclic, C1-C10-alkyl group. Most preferably $R^1$ is a tert-butyl group.

It is preferred that any $R^1$ group present is located at 3, 4 and/or 5 position to the bond to the indenyl group, e.g. the 4-position.

In one preferred embodiment two adjacent $R^1$ groups taken together can form a further mono or multicyclic ring condensed to Ph. The new ring is preferably 5 or 6 membered or the $R^1$ groups preferably form two new rings such as one further five membered and six membered ring.

The new ring or rings can be aliphatic or aromatic. Preferably any new ring forms an aromatic system with the Ph ring to which it is attached.

In this way groups such as indolyl, carbazolyl, benzothiophenyl and naphthyl can be formed. It is also within the scope of the invention for these new rings to be substituted by 1 or 2 $R^4$ groups where $R^4$ is a C1-10 alkyl.

The subscript m is preferably 3 or 4 thus forming a five or six membered ring with the atoms of the indenyl. It is also preferred if at least one $R^9$ group is H, i.e. $—(CHR^9)m-$. $R^9$ is preferably H or 1-6 alkyl. Ideally there are no non hydrogen groups or one non hydrogen group within the group $—(CR^9_2)m-$ as a whole. Ideally, the ring is represented by the group $—(CH_2)m-$ where m is 2 to 5, preferably 3 or 4.

In a preferred embodiment therefore the complex of the invention is of formula (II)

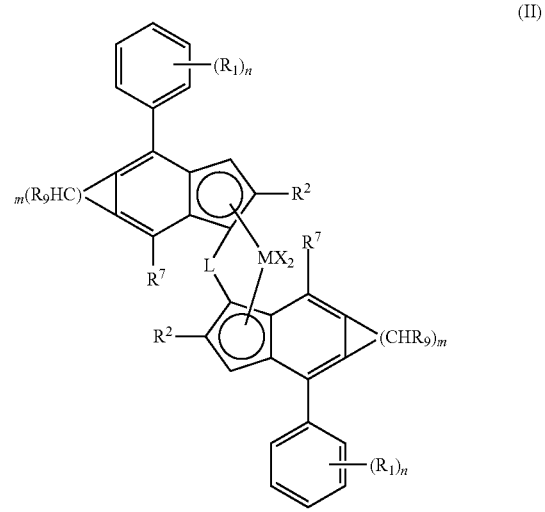

(II)

wherein
M is Zr or Hf;
each X is a hydrogen atom, benzyl, OR, a halogen atom, or an R group;
R is $C_{1-10}$ alkyl or $C_{6-10}$ aryl;
L is methylene, ethylene or $SiR^8_2$;
$R^8$ is C1-10 alkyl, $C_{6-10}$-aryl, $C_{7-12}$-alkylaryl, or $C_{7-12}$-arylalkyl;
$R^2$ is Me, $CH_2$-Ph, $CH_2—C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;
$R^7$ is H or $C_{1-3}$-alkyl;
n is 0 to 2; preferably 1;
each $R^1$ is $C_{1-10}$-alkyl;
each $R^9$ is H or $C_{1-10}$-alkyl;
m is 2 to 4;
and wherein the two ligands forming the complex are identical.

In a still further preferred embodiment, the invention provides a complex of formula (III)

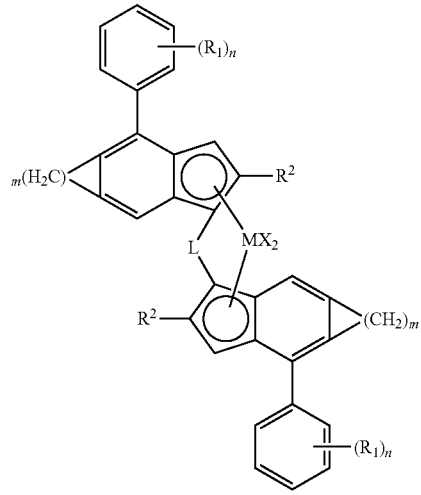

in which:

M is Zr; or Hf each $R^2$ is Me, $CH_2$-Ph, $CH_2-C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

L is $SiR^8_2$;

$R^8$ is $C_{1-8}$ alkyl;

each X is a halogen atom, methoxy, benzyl or methyl;

n is 0 or 1;

$R^1$ is $C_{1-6}$ alkyl;

m is 3 or 4;

and wherein the two ligands forming the complex are identical.

In a further highly preferred embodiment, the invention provides a complex of formula (IV)

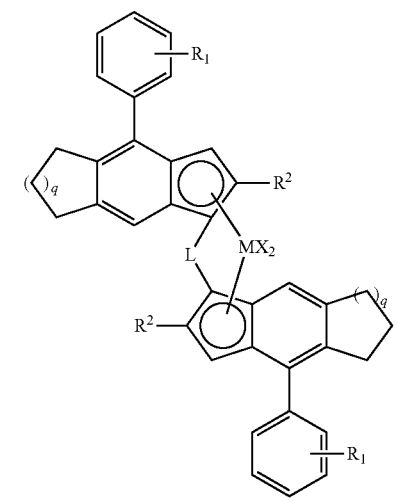

wherein L is $SiR^8_2$;

q is 1 or 2;

$R^1$ is $C_{1-6}$ alkyl;

$R^8$ is $C_{1-8}$ alkyl;

$R^2$ is Me, $CH_2$-Ph, $CH_2-C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

each X is a halogen atom, methoxy, benzyl or methyl;

M is Zr or Hf;

and wherein the two ligands forming the complex are identical.

Another attractive metallocene is of formula (V)

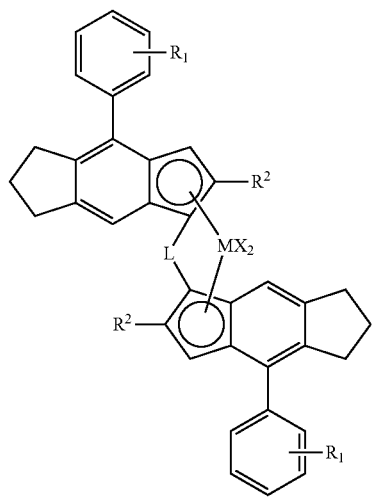

wherein L is $SiR^8_2$;

$R^8$ is $C_{1-8}$ alkyl;

$R^1$ is $C_{1-6}$ alkyl ideally at the 4-position;

$R^2$ is $C_{1-6}$ alkyl;

each X is a halogen atom, methoxy, benzyl or methyl; and

M is Zr or Hf.

For the avoidance of doubt, any narrower definition of a substituent offered above in connection with any formula can be combined with any other broad or narrow definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2006/097497A1 and EP-A-2402353 and the other prior art references mentioned above and in the examples section disclose the necessary chemistry and are herein incorporated by reference.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_{1-6}-alkyl)_3$, can be used.

Boron based cocatalysts of interest include those of formula $$BY_3$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are p-fluorophenyl, 3,5-difluorophenyl, pentafluorophenyl, 3,4,5-trifluorophenyl and 3,5-di(trifluoromethyl)phenyl. Preferred boron based cocatalysts are tris(4-fluorophenyl)borane, tris(3,5-difluorophenyl)borane, tris(2,4,6-trifluorophenyl)borane, tris(pentafluorophenyl)borane and/or tris (3,4,5-trifluorophenyl)borane.

Particular preference is given to tris(pentafluorophenyl) borane.

It is preferred however if borates are used, i.e. compounds containing a borate anion. Such ionic cocatalysts preferably contain a non-coordinating anion such as tetrakis(pentafluorophenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butyl ammonium, methyldiphenylammonium, pyridinium, p-bromo-N,N-dimethylanilinium or p-nitro-N,N-dimethylanilinium. Preferred ionic compounds which can be used according to the present invention include: tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl) ammoniumtetrakist(pentafluorophenyl)borate, triphenylcarbeniumtetrakis(pentafluorophenyl)borate, or ferroceniumtetrakis(pentafluorophenyl)borate. Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis (pentafluorophenyl)borate.

The use of $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4^{2-}$ is especially preferred.

Suitable amounts of cocatalyst will be well known to the skilled man.

Manufacture

The catalyst of use in the process of the invention is in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained.

By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained. Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi-and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, NH$_2$, NR"$_2$. —COOH, —COONH$_2$, oxides of alkenes, —CR"=CH$_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, NH$_2$, NR"$_2$. —COOH, —COONH$_2$, oxides of alkenes, —CR"=CH$_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e. g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C. per minute, preferably 0.5 to 6° C. per minute and more preferably in 1 to 5° C. per minute.

In case a melt of e. g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immiscibility can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e. g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e. g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e. g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Prepolymerisation ("Off-Line Prepolymerisation")

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymerisation is continued until the prepolymerisation degree (DP) defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leaching of catalyst components and thus local overheating.

After prepolymerisation, the catalyst can be isolated and stored.

Polymerisation

The invention relates to the copolymerisation of propylene and ethylene to produce copolymer with high amounts of ethylene, i.e. typically more than 10 wt % ethylene in the xylene soluble fraction. The upper limit for ethylene content in the xylene soluble fraction may be 70 wt % such as 65 wt %. Thus, ethylene content in the xylene soluble fraction may be 10 to 70 wt-%, preferably 15 to 65 wt-%.

Polymerization in the method of the invention may be effected in one or more, e.g. 1, 2 or 3, polymerization reactors of which at least one reactor is a gas phase reactor The process may also involve a prepolymerisation step. This prepolymerisation step is a conventional step used routinely in polymer synthesis and is to be distinguished from the catalyst prepolymerisation step discussed above.

Preferably, the process of the invention employs two or three, preferably three main reactors, provided that at least one reactor is a gas phase reactor. Ideally the process of the invention employs a first reactor operating in bulk and a second and third reactors being gas phase reactors. The process may also utilise a prepolymerisation step. Bulk reactions may take place in a loop reactor.

The inventive process of the invention can form a random propylene ethylene copolymer but is ideally suited for the preparation of a heterophasic propylene ethylene copolymer. In that polymer, a homopolymer or random propylene-ethylene copolymer matrix is combined with a copolymeric amorphous fraction to form the heterophasic copolymer of the invention.

Ideally therefore a propylene matrix (homopolymer or random copolymer) is formed in bulk and a propylene ethylene copolymer amorphous phase formed in a gas phase reactor. Where two gas phase reactors are employed, a first gas phase reactor may produce a homopolymer or copolymer component, ideally a homopolymer component. Additional polymer component from a first gas phase reactor forms part of the matrix of the polymer.

For bulk and gas phase copolymerisation reactions, the reaction temperature used will generally be in the range 60 to 115° C. (e.g. 70 to 90° C.), the reactor pressure will generally be in the range 10 to 25 bar for gas phase reactions with bulk polymerisation operating at slightly higher pressures. The residence time will generally be 0.25 to 8 hours (e.g. 0.5 to 4 hours). The gas used will be the monomer optionally as mixture with a non-reactive gas such as nitrogen or propane. It is a particular feature of the invention that polymerisation takes place at temperatures of at least 60° C.

Generally the quantity of catalyst used will depend upon the nature of the catalyst, the reactor types and conditions and the properties desired for the polymer product. As is well known in the art hydrogen can be used for controlling the molecular weight of the polymer.

Splits between the various reactors can vary. When two reactors are used, splits are generally in the range of 30 to 70 wt % to 70 to 30 wt % bulk to gas phase, preferably 40 to 60 to 60 to 40 wt %. Where three reactors are used, it is preferred that each reactor preferably produces at least 20 wt % of the polymer, such as at least 25 wt %. The sum of the polymer produced in gas phase reactors should preferably exceed the amount produced in bulk. Values might be 30 to 45 wt % in bulk and 70 to 55 wt % in gas phase reactors.

Polymer

The invention relates to a process for the formation of copolymers of propylene and ethylene. The xylene soluble fraction of the polymers of the invention must have a minimum ethylene content of 10 wt %. The maximum ethylene content of the xylene soluble fraction is preferably 70 wt %. Ideally the ethylene content of the xylene soluble fraction is less than 65 wt %. Thus, ethylene content in the xylene soluble fraction may be 10 to 70 wt-%, preferably 15 to 65 wt-%. The catalysts of the invention enable the formation of high molecular weight, polymers. The molecular weight of the xylene soluble fraction of the copolymers can be at least 150,000, preferably at least 175,000.

$MFR_2$ of the final polymer may be 0.1 to 100 g/10 min, such as 1 to 80 g/10 min. Values up to 60 g/10 min are possible such as up to 40 g/10 min. $MFR_2$ is preferably 1 to 30 g/10 min.

The polymers of the invention preferably have a large xylene soluble fraction. Typically, the xylene soluble fraction forms 10 to 60 wt % of the polymer, such as 10 to 55 wt %, such as 20 to 50 wt %, especially 23 to 40 wt %.

The viscosity of the xylene soluble fraction is preferably 1.2 dL/g or more, such as at least 1.5 dl/g, ideally 1.8 di/g or more.

The copolymers have higher molecular weights, as shown by the high intrinsic viscosity (IV) values. IV values preferably obey the following relationship:

$$IV(XS) > -0.032 \times (C2(XS)) + 2.82$$

It is preferred if the polymer has a melting point of 140° C. or more, preferably 150° C. or more. It is also preferred if the polymer has a Tc of 90° C. or more, preferably 100° C. or more, most preferably 109° C. or more.

The low temperature impact and the stiffness/impact balance of the polymers of the invention are also improved.

Charpy impact strength at −19° C. is preferably at least 4 $kJ/m^2$, such as at least 5 $kJ/m^2$, ideally at least 8 $kJ/m^2$.

Charpy impact strength at 23° C. is preferably at least 10 $kJ/m^2$, such as at least 20 $kJ/m^2$, preferably at least 40 $kJ/m^2$.

The BDT temperature of polymers with the same level of C2 in the xylene soluble fraction is clearly lower with polymers produced according to the invention compared to the comparative polymers. This clear trend can be seen both with smaller amounts of C2 in XS, whereby the BDT temperature value is low or very low, as well in polymers where the C2 in XS is reasonable high. This trend is shown in examples, see e.g. FIG. 4. —As can be seen from the results, BDT temperature is well below −10° C., even below −20° C., when C2 amount in XS is below 40 wt-%, (in the comparative examples lowest BDT temperature is above −10° C.) and below 20° C., when C2 amount in XS is above 50 wt-% (in the comparative examples clearly above 20° C.).

The tensile modulus of the polymer may be at least 600 MPa, such as at least 800 MPa.

The polymers made by the catalysts of the invention are useful in all kinds of end articles such as pipes, films (cast, blown or BOPP films), fibers, moulded articles (e.g. injection moulded, blow moulded, rotomoulded articles), extrusion coatings and so on.

The invention will now be illustrated by reference to the following non-limiting Examples and figures.

FIG. 1 compares the Intrinsic viscosity of the xylene soluble fraction as a function of catalyst, GP2 pressure and temperature, and copolymer composition. Except were indicated, GP2 conditions are 20 barg and 70° C. Inventive area lies above the dotted line.

FIG. 2 shows catalyst activity (per gram of metallocene per hour) as a function of copolymer composition in terms of C2 XS content.

In FIG. 3, the improvements of mechanical properties of the heterophasic polymers compositions produced with the process of the invention using specific catalysts are shown.

FIG. 3a (Inventive example PI-1-1 and comparative example PC-2-4) and 3b (Inventive example PI-1-2 and comparative example PC-2-2) show impact strength as a function of increasing temperature. It is clear that the invention examples have improved impact in a wide temperature range, especially at low temperature.

FIG. 4 shows that the BDTT of polymers of inventive examples with reference to C2(XS) wt %. It is clear that the BDTT is lower than of the polymers of the comparative examples at the same C2 content.

FIG. 5 plots tensile modulus vs charpy impact strength. This shows improved impact/stiffness balance, which is highly desired. I.e. high impact is desired at lower temperature, but still the stiffness has to be as high as possible.

FIG. 6 compares the effects of nucleation on tensile modulus as a function of impact strength.

MEASUREMENT METHODS

ICP Analysis

The elemental analysis of a catalyst was performed by taking a solid sample of mass M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental iCAP 6300 Inductively Coupled Plasma—Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% $HNO_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The values reported in Table 4 are an average of three successive aliquots taken from the same sample and are related back to the original catalyst by inputting the original mass of sample and the dilution volume into the software.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

GPC: Molecular weight averages, molecular weight distribution, and polydispersity index (Mn, Mw, MWD)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Xylene Solubles (XS)

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks. The solution from the first 100 ml vessel is evaporated in nitrogen flow and the residue is dried under vacuum at 90° C. until constant weight is reached.

XS %=(100·m·Vo)/(mo·v); mo=initial polymer amount (g); m=weight of residue (g); Vo=initial volume (ml); v=volume of analysed sample (ml).

Catalyst Activity

The catalyst activity was calculated on the basis of following formula:

$$\text{Catalyst Activity (kg/g*h)} = \frac{\text{amount of polymer produced (kg)}}{\text{catalyst loading (g)} \times \text{polymerisation time (h)}}$$

ETHYLENE Content (FTIR $C_2$)

Ethylene content was measured with Fourier transform infrared spectroscopy (FTIR) calibrated to results obtained by $^{13}C$ NMR spectroscopy using a method which accounts for regio-irregular propylene insertion. When measuring the ethylene content in polypropylene, a thin film of the sample (thickness about 0.220 to 0.250 mm) was prepared by hot pressing at 230° C. (preheat 5 min., press 1 min., cooling (cold water) 5 min.) using a Graseby Specac press. The FTIR spectra of the sample was recorded immediately with Nicolet Protégé 460 spectrometer from 4000 to 400 $cm^{-1}$, resolution 4 $cm^{-1}$, scans 64. The area of absorption peak at 733 $cm^{-1}$ (baseline from 700 $cm^{-1}$ to 760 $cm^{-1}$) and height of reference peak at 809 $cm^{-1}$ (baseline from 780 $cm^{-1}$ to 880 $cm^{-1}$) were evaluated. The result was calculated using the following formula $$E_{tot}=a \times A/R+b$$

where

A=area of absorption peak at 733 $cm^{-1}$

R=height of reference peak at 809 $cm^{-1}$ $E_{tot}$=C2 content (wt.-%)

a, b are calibration constants determined by correlation of multiple calibration standards of know ethylene content as determined by $^{13}C$ NMR spectroscopy to A/R.

The result was reported as an average of two measurements.

Intrinsic Viscosity

Measured according to DIN ISO 1628/1, October 1999 (in Decalin at 135° C.).

Melting temperature $T_m$, crystallization temperature $T_c$, is measured with Mettler TA820 differential scanning calorimetry (DSC) on 5-10 mg samples according to ISO 11357-3. Both crystallization and melting curves were obtained during 10° C./min cooling and heating scans between 30° C. and 200° C. Melting and crystallization temperatures were taken as the peaks of endotherms and exotherms.

Glass Transition Temperatures—DMTA

The dynamic-mechanical analysis (DMTA) data are obtained according to ISO 6721-1 (General principles) & 6721-7 (Torsional vibration—Non-resonance method).

Brittle-to-ductile Transition Temperature

The determination of the brittle-to-ductile transition temperature (BDTT) is based on the a(cN) values as determined from Charpy instrumented impact strength according to ISO 179-2:2000 on V-notched specimen with a geometry of 80×10×4 mm3 as required in ISO 179-1eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

Tensile Modulus

Tensile properties were determined according to ISO 527-2 (cross head speed=50 mm/min; 23° C.) using injection moulded specimens as described in EN ISO 1873-2 (ISO multibar, dog bone shape, 4 mm thickness).

Charpy Notched Impact Strength

Charpy impact strength was determined according to ISO 179-1eA:2000 on V-notched samples of 80×10×4 mm³ at 23° C. (Charpy impact strength (23° C.)) and −19° C. (Charpy impact strength (−19° C.)). A standard impact velocity of 1.5 m/s was used.

The test specimens having a dimension of 80×10×4 mm³ were cut from the central part of ISO multibar specimens prepared by injection moulding in line with ISO 1873-2.

EXAMPLES

Metallocene Example 1 (MC-1)

(rac-μ-{bis-[η⁵-2-methyl-4-(4-tert-butylphenyl)-1,5,6,7-tetrahydro-s-indacen-1-yl] dimethylsilanediyl}dichlorozirconium,) was prepared as described in WO2006/097497A1. The ¹H NMR spectrum of it corresponds to that reported in the mentioned patent application.

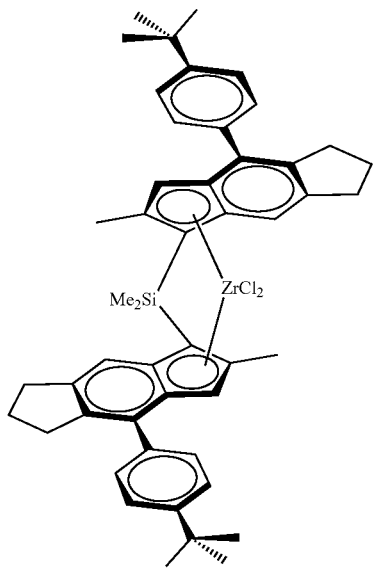

Catalyst Preparation

Catalyst Example 1 (E1)

The catalyst E1 was prepared according to the procedure described in the Example 5 of WO 2003/051934 with hexadecafluoro-1,3-dimethylcyclohexane as the continuous phase, a mixture of perfluoroalkylethyl acrylate esters having different perfluoroalkyl chain lengths as the surfactant precursor and (rac-μ-{bis-[η⁵-2-methyl 4-(4-tert-butylphenyl)-1,5,6,7-tetrahydro-s-indacen-1-yl] dimethylsilanediyl}dichlorozirconium as the metallocene.

The detailed catalyst preparation was performed as follows.

Inside a glovebox, 80 μL of commercial mixture of dry and degassed perfluoroalkylethyl acrylate esters were mixed with 2 mL of MAO in a septum bottle and left to react overnight (surfactant solution). The following day, 61.40 mg of the metallocene (MC-1) was dissolved in 4 mL of the MAO solution in another septum bottle and left to stir inside the glovebox (catalyst solution).

After 60 minutes, the 4 mL of the catalyst solution and 1 mL of the surfactant solution were successively added into a 50 mL emulsification glass reactor containing 40 mL of hexadecafluoro-1,3-dimethylcyclohexane at −10° C. and equipped with an overhead stirrer (stirring speed=600 rpm). A red-orange emulsion formed immediately and was stirred during 15 minutes at 0° C./600 rpm. The emulsion was then transferred via a 2/4 Teflon tube to 100 mL of hot hexadecafluoro-1,3-dimethylcyclohexane at 90° C., and stirred at 600 rpm until the transfer was completed. The stirring speed was reduced to 300 rpm and the oil bath was removed. Stirring was continued at room temperature for 15 more minutes. When the stirrer was switched off, the catalyst was left to settle up on top of the continuous phase which was siphoned off after 45 minutes. The remaining red solid catalyst was dried during 2 hours at 50° C. over an argon flow. 0.23 g of a red free flowing powder was obtained.

Metallocene Example 2 (MC-2)

rac-1,1'-dimethylsilylene-bis[2-isobutyl-4-(4-tert-butylphenyl)-5,6,7-trihydro-s-indacen-1-yl] zirconium dichloride

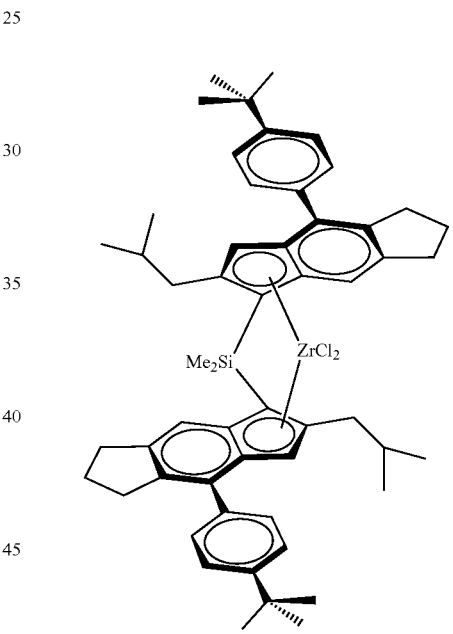

The synthesis of this compound is described in EP-A-2402353, example 1

Catalyst Preparation

Catalyst Example 2 (E2)

The catalyst (E2) was prepared according to the procedure described in the Example 5 of WO 2003/051934 with hexadecafluoro-1,3-dimethylcyclohexane as the immiscible solvent, a mixture of perfluoroalkylethyl acrylate esters having different perfluoroalkyl chain lengths as the surfactant precursor and rac-1,1'-dimethylsilylene-bis[2-isobutyl-4-(4-tert-butylphenyl)-5,6,7-trihydro-s-indacen-1-yl] zirconium dichloride as the metallocene (MC-2).

The detailed catalyst preparation was performed as follows:

Inside a glovebox, 80 μL of a commercial mixture of dry and degassed perfluoroalkylethyl acrylate esters were mixed with 2 mL of MAO in a septum bottle and left to react overnight (surfactant solution). The following day, 68.80 mg of the metallocene MC-2 were dissolved in 4 mL of the MAO solution in another septum bottle and left to stir inside the glovebox (catalyst solution).

After 60 minutes, the 4 mL of the catalyst solution and 1 mL of the surfactant solution were successively added into a 50 mL emulsification glass reactor containing 40 mL of hexadecafluoro-1,3-dimethylcyclohexane at −10° C. and equipped with an overhead stirrer (stirring speed=600 rpm). A red-orange emulsion formed immediately and was stirred during 15 minutes at 0° C./600 rpm. The emulsion was then transferred via a 2/4 Teflon tube to 100 mL of hot hexadecafluoro-1,3-dimethylcyclohexane at 90° C., and stirred at 600 rpm until the transfer was completed. The stirring speed was reduced to 300 rpm and the oil bath was removed. Stirring was continued at room temperature for 15 more minutes. When the stirrer was switched off, the catalyst was left to settle up on top of the continuous phase which was siphoned off after 45 minutes. The remaining red solid catalyst was dried during 2 hours at 50° C. over an argon flow.

Comparative Metallocene 3 (MC-C3) and Comparative Catalyst Example 3 (C3)

Anti-dimethylsilylene(2-methyl-4-phenyl-5-methoxy-6-tert-butyl-indenyl)(2-methyl-4-phenyl-6-tert-butyl-indenyl)zirconium dichloride (metallocene MC-C3)

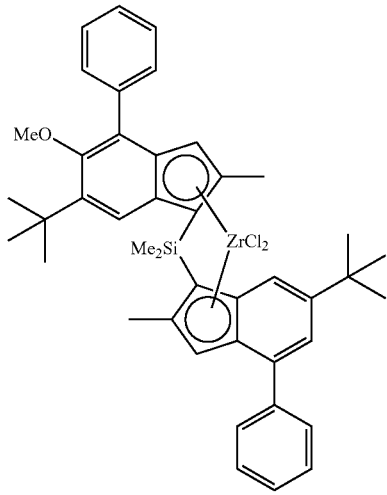

This metallocene was prepared and formed into a catalyst as described in WO2013/007650, catalyst E1. Three slightly different alternative versions were prepared as shown in table 1 (C3a, C3b and C3c). The compositions of the catalysts used are described in Table 1 below. Catalyst off-line prepolymerisations were done in the same manner as described in off-line prepolymerisation example in WO2013/007650

TABLE 1

| | | Catalyst composition | | |
|---|---|---|---|---|
| catalyst | DP* wt/wt | Al/Zr molar ratio catalyst** mol/mol | MC amount in catalyst** wt % | MC amount in prepolymerised catalyst*** wt % |
| C3a | 2.7 | 253 | 4.99 | 1.35 |
| C3b | 3.2 | 242 | 5.21 | 1.24 |
| C3c | 3.5 | 250 | 5.05 | 1.12 |
| E1 | 2.9 | 588 | 2.35 | 0.60 |
| E2 | 3.9 | 308 | 4.82 | 0.98 |

*Prepolymerisation degree
**in non-prepolymerised catalyst
***in prepolymerised catalyst Comparative Metallocene 4 (MC-C4) and Comparative Catalyst Example 4 (C4)

Rac-cyclohexyl(methyl)silanediylbis(2-methyl-4-(4'-tertbutylphenyl)indenyl) zirconium dichloride (MC-C4)

This catalyst was prepared as described in example 10 of WO2010/052263 and off-line prepolymerized as described above, until a prepolymerisation degree of 3.1 had been reached.

Comparative Catalyst Example 5

Catalyst was prepared using as metallocene MC-1, which was supported on a silica support (XPO-2485) following the procedure of WO2006/097497A1. Catalyst yield was 13 g.

Polymerization Examples

Polymerisations of inventive polymerisation examples (series PI-1 and PI-2) and comparative polymerisation examples (series PC-1 and PC-2) were carried according to the following procedure. More details are disclosed in Table 2.

Step 1: Bulk Propylene Homopolymerization

A stirred autoclave (double helix stirrer) with a volume of 21.2 dm³ containing 0.2 barg of polymerisation grade propylene was filled with additional 3.97 kg propylene plus the chosen amount of H2. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, off-line pre-polymerized catalyst (type, amount and degree of pre-polymerisation as listed in the tables) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the chosen H2 amount was added with a defined flow via thermal mass flow controller (MFC). The reactor temperature was held constant throughout the polymerization. The polymerization time was measured starting when the temperature was 2° C. below the set polymerization temperature.

Step 2: 1$^{st}$ Gas Phase (GP1), Propylene Homopolymerization.

After the bulk step was finished, the stirrer speed was adjusted to 50 rpm and the reactor pressure was reduced to 0.5 bar below the set pressure by venting.

Afterwards the stirrer speed was set to 180 rpm, the reactor temperature to 80° C. and the desired amount of H2 was dosed via MFC. Then the reactor P and T were held constant by feeding propylene via MFC to target pressure of 25 barg and by thermostatting at 80° C. for the time necessary to reach the target split.

Step 3: 2$^{nd}$ Gas Phase (GP2), Ethylene/Propylene Copolymerization

When the previous step was finished, the stirrer speed was reduced to 50 rpm, the reactor pressure lowered to 0.3 bar by venting, and the temperature and control device was set to 70° C. Then the reactor was filled with 200 g propylene, with flow of 70 g/min, then the pressure was lowered again to 0.3 barg by venting in order to remove all H2.

Afterwards the stirrer speed was adjusted to 180 rpm and the HB-Therm to 70° C. Then the reactor was pressurized by feeding propylene and ethylene with a defined C3/C2 ratio via flow controller (transition feed). The chosen C3/C2 ratio in the transition depends on the relative reactivity ratio value R of the two comonomers for the given catalyst system, as defined by:

$$R = \frac{\left(\frac{C_2}{C_3}\right)_{polymer}}{\left(\frac{C_2}{C_3}\right)_{gas\,phase}}$$

The speed of the reactor filling during the transition was limited by the max. flow of the gas flow controllers. When the reactor temperature was 1° C. below the target temperature of 70° C. and the reactor pressure reached the set value, the composition of the dosed C3/C2 mixture was changed to match the desired copolymer composition value and the temperature and pressure were held constant as long as the amount of C3/C2 gas needed to reach the target split of rubber to matrix was consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) (Hostanox P-EPQ) and then dried overnight in a fumehood followed by 2 hours in a vacuum drying oven at 60° C.

The nucleated materials have been prepared as described below. The heterophasic copolymer powders have been pre-mixed with clarifier (1700 ppm of Millad 3988) and antioxidant (2000 ppm of Irganox B225 and 500 ppm of Ca Stearate) and then compounded and pelletized on TSE-16 twin screw extruder. The temperature profile used was 170-190-210-220-200° C., from hopper to die, the screw speed was 180 rpm and the throughput 1.8 kg/h.

The polymerization conditions are summarized in Table 2. The results of polymer analysis are listed in Table 3. Physic-mechanical characterization results are shown in table 4.

TABLE 2

| | CATALYST | | | | BULK STEP, 80° C. | | GP1, T = 80° C. | | | | |
|---|---|---|---|---|---|---|---|---|---|---|---|
| Pol example | catalyst | catalyst* amount mg | total H2 ln | time min | Productivity in bulk kgPP/gcat* | Activity in bulk kgPP/g cat/h* | P barg | H2 in GP1 NL | time min | productivity in GP1 kgPP/g cat* | Activity in GP1 kgPP/g cat/h* |
| PC-1-1 | C4 | 61.0 | 2.0 | 30 | 11 | 21 | 30 | 0.315 | 67 | 7.4 | 6.6 |
| PC-1-2 | C4 | 75.8 | 1.8 | 30 | 10 | 19 | 30 | 0.315 | 55 | 7.1 | 7.8 |
| PC-2-1 | C3b | 41.7 | 4.5 | 20 | 14 | 43 | 30 | 1.911 | 40.2 | 11.2 | 16.7 |
| PC-2-2 | C3b | 40.7 | 4.5 | 20 | 16 | 47 | 30 | 1.480 | 41.2 | 12.2 | 17.8 |
| PC-2-3 | C3c | 42.9 | 3.5 | 20 | 15 | 44 | 25 | 1.100 | 46.5 | 8.6 | 11.1 |
| PC-2-4 | C3c | 42.0 | 3.5 | 20 | 14 | 41 | 25 | 1.100 | 47.8 | 9.9 | 12.4 |
| PI-1-1 | E1 | 30.8 | 1.5 | 20 | 18 | 53 | 25 | 0.750 | 59 | 17.9 | 18.2 |
| PI-1-2 | E1 | 31.3 | 1.5 | 20 | 15 | 46 | 25 | 0.750 | 67 | 14.4 | 12.9 |
| PI-1-3 | E1 | 30.8 | 1.5 | 20 | 16 | 48 | 25 | 0.750 | 71 | 15.6 | 13.2 |
| PI-1-4 | E1 | 31.3 | 1.5 | 30 | 24 | 49 | 25 | 0.750 | 63 | 15.0 | 14.3 |
| PI-2-1 | E2 | 24.1 | 1.5 | 27 | 24 | 53 | 25 | 0.350 | 67 | 22.8 | 20.5 |
| PI-2-2 | E2 | 24.1 | 1.5 | 30 | 26 | 52 | 25 | 0.350 | 77 | 23.7 | 18.4 |
| PI-2-3 | E2 | 24.9 | 1.5 | 30 | 24 | 49 | 25 | 0.350 | 76 | 24.1 | 19.0 |
| PI-2-4 | E2 | 24.3 | 1.5 | 30 | 25 | 50 | 25 | 0.350 | 75 | 23.3 | 18.6 |
| PI-2-5 | E2 | 24.9 | 1.5 | 30 | 27 | 53 | 25 | 0.350 | 71 | 22.9 | 19.3 |
| PI-1-5 | E1 | 31.8 | 1.5 | 20 | 10 | 31 | 25 | 0.750 | 61 | 10.7 | 10.5 |
| PC-5 | C5** | 140.0 | 1.5 | 20 | 5.0 | 15 | 25 | 0.750 | 67 | 3.2 | 2.9 |

| | GP2, T = 70° C. | | | | | |
|---|---|---|---|---|---|---|
| Pol example | P in GP2 barg | time GP2 min | feed C2/C3 wt during transition | feed C2/C3 wt during run | Productivity in GP2 kg/gcat* | Activity in GP2 kg/gcat/h* |
| PC-1-1 | 20 | 129 | 0.87 | 0.42 | 7.0 | 3.3 |
| PC-1-2 | 25 | 62 | 0.86 | 0.43 | 9.2 | 8.9 |

TABLE 2-continued

| | | | | | | |
|---|---|---|---|---|---|---|
| PC-2-1 | 20 | 219 | 1.38 | 0.42 | 6.7 | 4.6 |
| PC-2-2 | 20 | 183 | 1.38 | 0.43 | 17.2 | 5.6 |
| PC-2-3 | 20 | 105 | 3.23 | 1.00 | 10.0 | 5.7 |
| PC-2-4 | 20 | 171 | 0.82 | 0.25 | 9.6 | 3.4 |
| PI-1-1 | 20 | 73 | 0.62 | 0.25 | 15.3 | 12.6 |
| PI-1-2 | 20 | 73 | 1.68 | 0.67 | 13.3 | 11.0 |
| PI-1-3 | 20 | 91 | 3.75 | 1.50 | 12.6 | 8.3 |
| PI-1-4 | 20 | 105 | 0.44 | 0.18 | 17.7 | 10.1 |
| PI-2-1 | 20 | 52 | 0.65 | 0.25 | 18.7 | 21.6 |
| PI-2-2 | 20 | 58 | 0.42 | 0.18 | 19.7 | 20.6 |
| PI-2-3 | 20 | 70 | 1.67 | 0.67 | 20.6 | 17.7 |
| PI-2-4 | 20 | 100 | 3.73 | 1.49 | 21.0 | 12.6 |
| PI-2-5 | 20 | 55 | 0.38 | 0.15 | 19.8 | 21.6 |
| PI-1-5 | 20 | 87 | 1.67 | 0.65 | 27.1 | 18.7 |
| PC-5 | 20 | 87 | 1.67 | 0.66 | 10.1 | 7.0 |

*based on non-prepolymerised catalyst;
**silica supported catalyst, no prepolymerisation;

TABLE 3

| | | ANALYSIS TOTAL | | | | | | ANALYSIS XS | | | | |
|---|---|---|---|---|---|---|---|---|---|---|---|---|
| | | MFR2 | Split bulk | Split GP1 | Split GP2 | XS | Tc | Tm | IV (XS) | C2 (XS) | R (C2/C3) | GPC XS | |
| Pol example | Catalyst | g/10 min | % | % | % | w % | ° C. | ° C. | dL/g | | | Mn | Mw |
| PC-1-1 | C4 | 40 | 43 | 30 | 28 | 29.9 | | | 0.6 | 25.4 | 0.40 | 27000 | 55000 |
| PC-1-2 | C4 | 54 | 37 | 28 | 36 | 36.7 | 109.2 | 148.9 | 0.7 | 28.8 | 0.47 | 30000 | 61000 |
| PC-2-1 | C3b | 31 | 34 | 27 | 40 | 40.2 | | | 1.8 | 30 | 0.31 | 68000 | 164000 |
| PC-2-2 | C3b | 18.4 | 35 | 27 | 38 | 43.4 | 112.9 | 148.2 | 1.7 | 29.2 | 0.30 | 70000 | 165000 |
| PC-2-3 | C3c | 15.2 | 44 | 26 | 30 | 30.7 | 110.9 | 148.1 | 1.9 | 53.7 | 0.36 | 78000 | 178000 |
| PC-2-4 | C3c | 19.6 | 41 | 30 | 29 | 27.7 | 113.3 | 147.9 | 1.8 | 21.6 | 0.34 | 82000 | 191000 |
| PI-1-1 | E1 | 10.1 | 35 | 35 | 30 | 32.7 | 114.9 | 154.7 | 2.3 | 22.3 | 0.47 | 84000 | 234000 |
| PI-1-2 | E1 | 14.3 | 35 | 34 | 31 | 33.6 | 114.8 | 154.3 | 2.0 | 37.5 | 0.36 | 66000 | 189000 |
| PI-1-3 | E1 | 11.5 | 36 | 35 | 29 | 30.6 | 113.2 | 154.3 | 2.1 | 56.9 | 0.35 | 68000 | 216000 |
| PI-1-4 | E1 | 8 | 43 | 26 | 31 | 26.8 | 113.1 | 154.1 | 2.7 | 17.5 | 0.48 | 102000 | 302000 |
| PI-2-1 | E2 | 12.7 | 36 | 35 | 29 | 33.2 | 113 | 155.6 | 2.3 | 20 | 0.39 | | |
| PI-2-2 | E2 | 10.6 | 38 | 34 | 28 | 30.3 | 112.7 | 155.7 | 2.4 | 17 | 0.49 | | |
| PI-2-3 | E2 | 15.5 | 35 | 35 | 30 | 32.3 | 114.5 | 156.0 | 1.8 | 37.8 | 0.36 | | |
| PI-2-4 | E2 | 14.3 | 36 | 34 | 30 | 32.3 | 114.2 | 155.5 | 2.0 | 56.3 | 0.35 | | |
| PI-2-5 | E2 | 8.7 | 38 | 33 | 29 | 28.6 | 109.8 | 155.0 | 2.5 | 14.8 | 0.46 | | |
| PI-1-5 | E1 | 17.4 | 38 | 39 | 22 | 22.5 | 110.8 | 154.1 | 2.3 | 44.4 | 0.48 | 72000 | 219000 |
| PC-5 | C5 | 4.6 | 48 | 30 | 22 | 20.3 | 111.0 | 154.0 | 2.9 | 42.2 | 0.44 | 118000 | 310000 |

TABLE 4

| | | BDT | Charpy $a_{cN}/$ kJ/m²@1.5 m/s | | Tensile test | | DMTA | | |
|---|---|---|---|---|---|---|---|---|---|
| | | | −19° C. | 23° C. | Tensile Modulus | Elongation @ break | $T_\beta$ (EPR) | $T_\beta$ (PP) | G'@ 23° C. |
| Pol Example | Catalyst | $T_{flex}$ ° C. | kJ/m² | kJ/m² | Mpa | % | ° C. | ° C. | Mpa |
| PC-1-1 | C4 | 29 | 3.4 | 16.4 | 660 | 448 | −45.1 | −1.0 | 396 |
| PC-1-2 | C4 | | | | | | | | |
| PC-2-1 | C3b | 2 | 9.5 | 32.4 | 817 | 243 | −46.6 | 1.2 | 357 |
| PC-2-24 | C3b | −7 | 10.5 | 46.0 | 946 | 83 | −46.6 | 1.4 | 373 |
| PC-2-3 | C3c | 26 | 7.8 | 16.6 | 1101 | 304 | −56.0 | 2.1 | 444 |
| PC-2-4 | C3c | −1 | 5.3 | 44.6 | 946 | 412 | −41.4 | 0.7 | 451 |
| PI-1-1 | E1 | −22 | 45.0 | 56.0 | 812 | 351 | −36.0 | 0.0 | 361 |
| PI-1-2 | E1 | −25 | 44.5 | 56.0 | 1017 | 383 | −52.1 | 2.0 | 417 |
| PI-1-3 | E1 | 17 | 9.4 | 53.7 | 1141 | 351 | −52.1 | 1.9 | 395 |

Discussion

At the same ethylene content, the inventive examples have higher impact strength both at low and high temperature. This is without any reduction in tensile modulus.

The polymers of the inventive examples also have high melting points.

highly desired. I.e. high impact is desired at lower temperature, but still the stiffness has to be as high as possible.

FIG. 6 compares the effects of nucleation on tensile modulus.

The subscript N represents a nucleated polymer. Table 5 shows a comparison of a nucleated and non nucleated polymer.

TABLE 5

| MC-1 Example | BDT $T_{flex}$ °C. | $a_{cN}/$ kJ/m²@1.5 m/s −19° C. kJ/m² | 23° C. kJ/m² | Tensile Modulus Mpa | Elongation @ break % | $T_\beta$ EPR °C. | $T_\beta$ (PP) °C. | G' @23° C. Mpa |
|---|---|---|---|---|---|---|---|---|
| PI-2-5 | −10 | 4.8 | 58.8 | 727 | 347 | −30.0 | 0.0 | 330 |
| PI 2-5N | −16 | 8.3 | 58.9 | 817 | 357 | −30.1 | −1.9 | 371 |

The comparison examples series 1 catalyst C4 (metallocene MC-C4) show that a metallocene without substituents on positions 5 and 6 of the indenyl rings, produces a copolymer with very low molecular weight. Comparison examples series 2 with catalyst C3 (metallocene MC-C3) show that a metallocene in which only one indenyl ligand bears substituents on positions 5 and 6, while the second one does not, still produces a copolymer with lower molecular weight.

It can also be seen from polymerisation examples PI-1-5 (inventive) and PC-5 (comparative) that Comparative catalyst C5, (silica supported catalyst) has much lower activity in gas phase polymerisations under the same conditions than Inventive solid catalyst E1 (same metallocene complex (MC-1), but prepared without any external carrier). Further, it was seen that the elastomeric material (rubber) produced in the copolymerisation in gas phase grew outside the pores of the supported catalyst leading to loss of flowability at C2 ~40 wt %, whereas the morphology of the corresponding polymer produced using inventive catalyst E1 gives a much better morphology (free flowing powder).

Brief Description of the Figures

The results are also plotted graphically in the attached figures.

FIG. 4 shows that the BDTT of polymers of inventive examples is lower than of the polymers of the comparative examples at the same C2 content.

Figure 1:
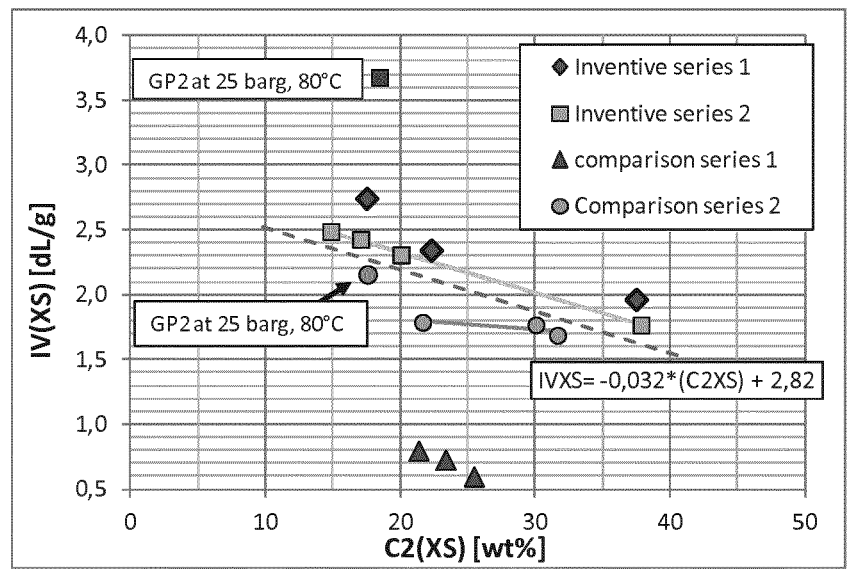
FIG. 1 shows the intrinsic viscosity of the xylene soluble fraction of examples and comparative examples of the invention. The preferred inventive area lies above the dotted line. With the present invention IV values of the XS fraction are higher with the polymers produced according to the invention than with polymers of the comparative examples.
Figure 2:
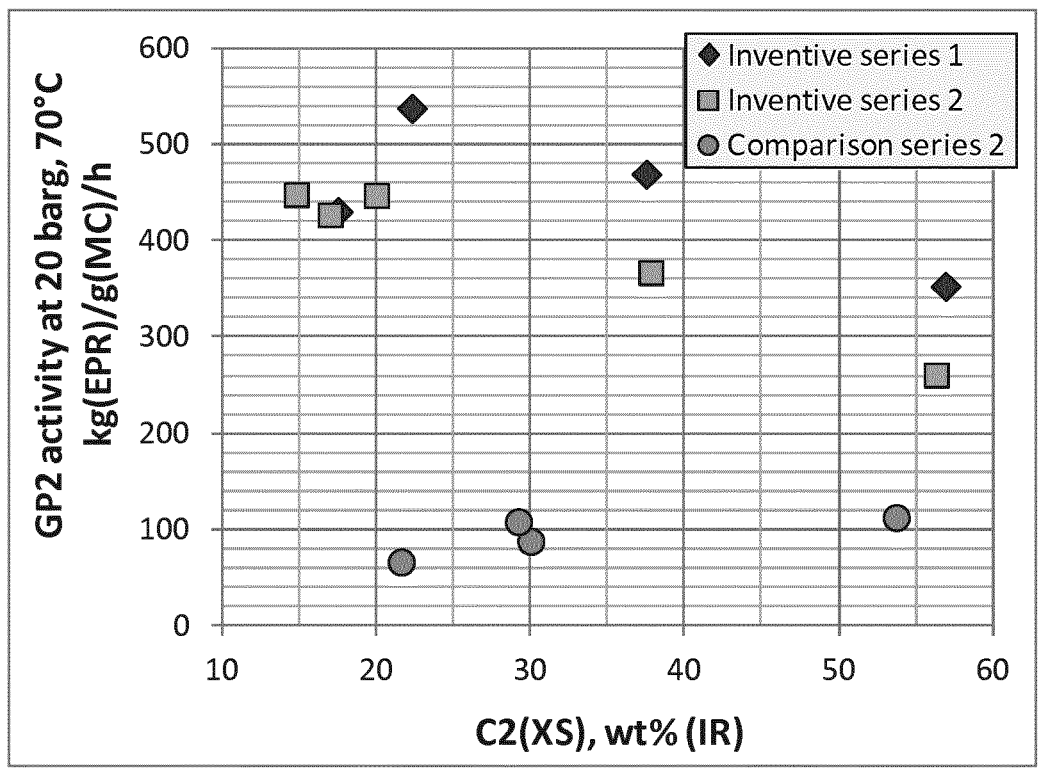
FIG. 2 shows the high catalyst activities achievable in gas phase reactor in the current invention In FIGS. 3 to 5 the improvements of mechanical properties of the heterophasic polymers compositions produced with the process of the invention using specific catalysts are shown. Results can be seen in the tables 4 and 5 as well.
Figure 3:
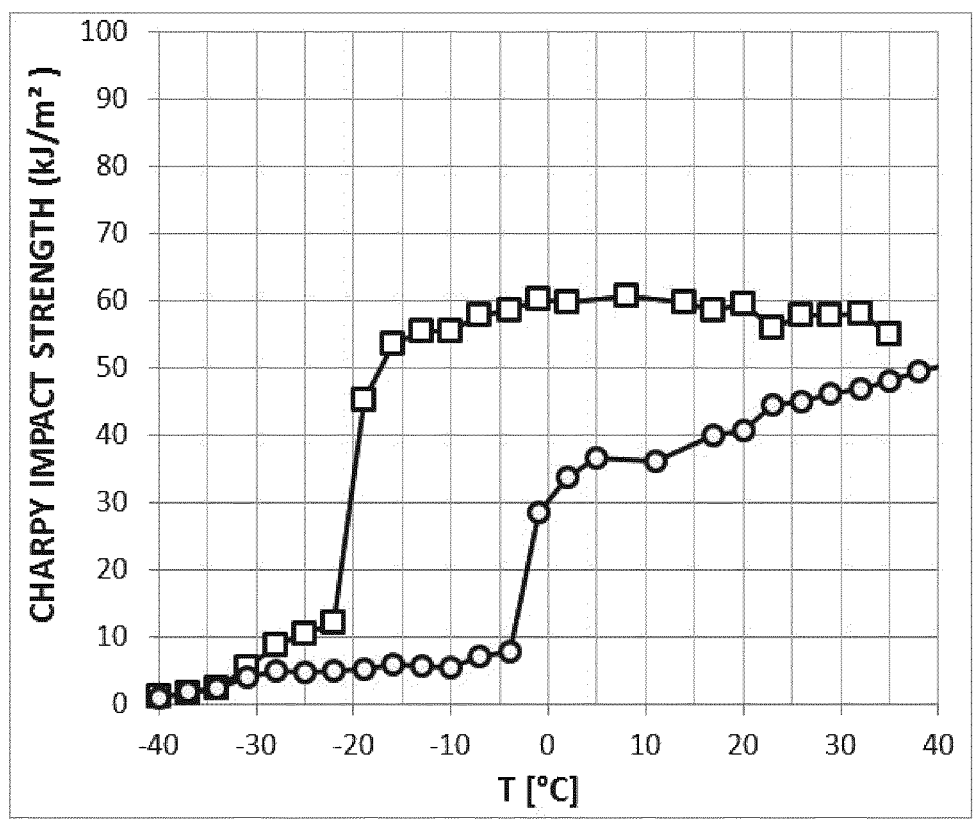
FIG. 3a (Inventive example PI-1-1 and comparative example PC-2-4) and 3b (Inventive example PI-1-2 and comparative example PC-2-2) show impact strength as a function of increasing temperature. It is clear that the invention example have improved impact in a wide temperature range, especially at low temperature impact is clearly higher than comparative polymers.
Figure 5:
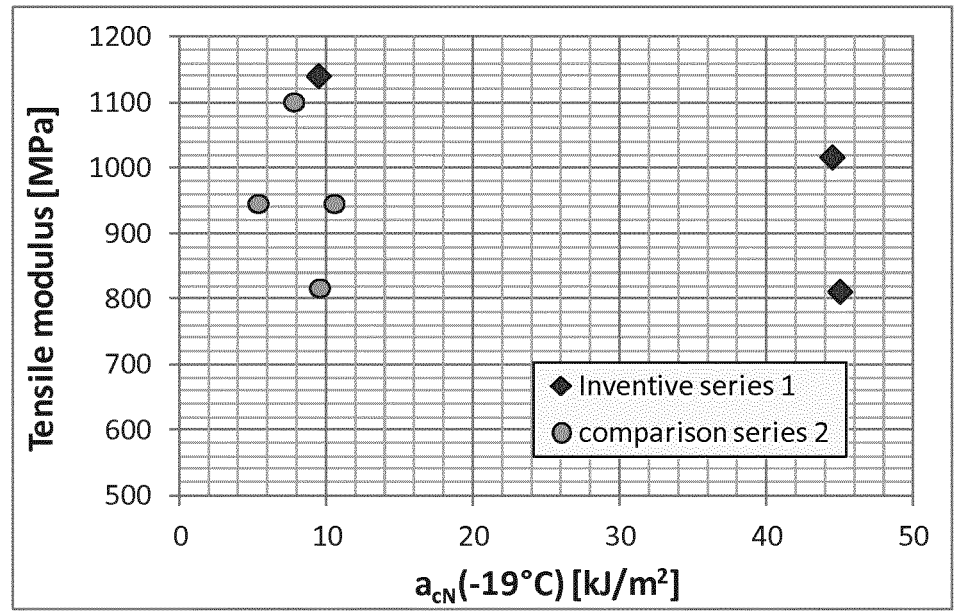
FIG. 5 plots tensile modulus vs charpy impact strength. This shows improved impact/stiffness balance, which is It is further preferred therefore if the polymers of the invention are nucleated with a nucleating agent.
Figure 6:
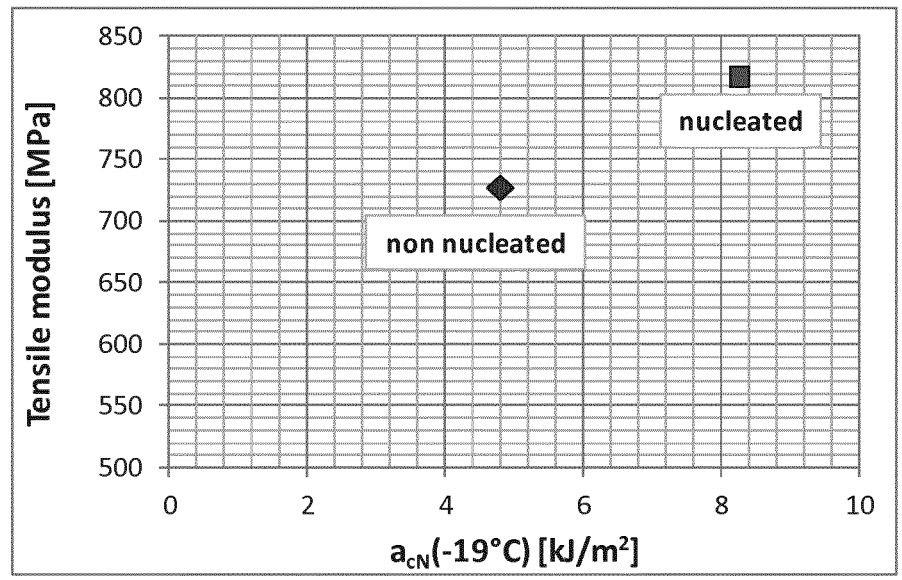

Overall, the polymers of the invention, in particular those from MC-1, show lower BDTT and higher absolute values of impact strength in a wide temperature range, and an improved impact/stiffness balance.

In addition, nucleation improves both BDTT and stiffness.

The invention claimed is:

1. A process for the preparation of a copolymer of propylene and ethylene comprising polymerising propylene and ethylene in the gas phase in the presence of a solid particulate catalyst free from an external carrier comprising:
   (i) a symmetrical complex of formula (I):

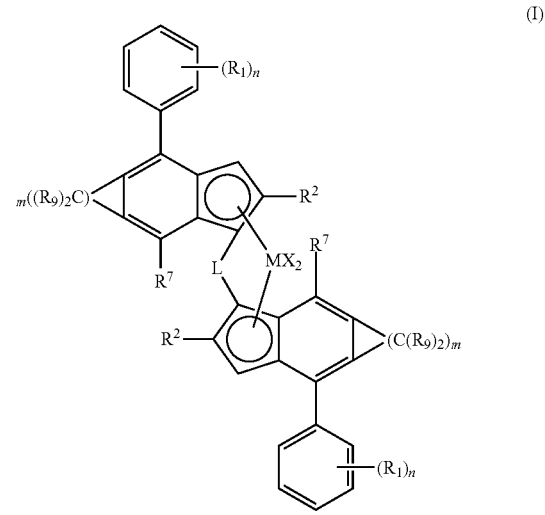

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;
R$^2$ is a C1-C20 hydrocarbyl radical;
m is 2 to 5;
R$^9$ is a H or C1-C20 hydrocarbyl radical;
R$^7$ is a hydrogen atom or a C$_{1-10}$-hydrocarbyl radical;

n is 0 to 3;
R¹ is a C1-C20 hydrocarbyl radical and optionally two adjacent R¹ groups taken together can form a further mono or multicyclic ring condensed to Ph ring optionally substituted by one or two groups R⁴; and
R⁴ is a C1-C10 alkyl radical;
and (ii) a cocatalyst;
wherein the xylene soluble fraction of the propylene ethylene copolymer has an ethylene content of at least 10 wt % and an intrinsic viscosity of at least 1.2 dl/g, and
wherein the xylene soluble fraction of the copolymer of propylene and ethylene has an ethylene content of at least 20 wt %.

2. A process as claimed in claim 1 wherein the catalyst used is in solid particulate form free from an external carrier.

3. A process as claimed claim 1 wherein the catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

4. A process as claimed in claim 1 wherein the catalyst is prepared by obtaining a complex of formula (I) and a cocatalyst;
forming a liquid/liquid emulsion system, which comprises a solution of catalyst components (i) and (ii) dispersed in a solvent, and solidifying said dispersed droplets to form solid particles.

5. A process as claimed in claim 1 wherein the copolymer of propylene and ethylene is a random propylene copolymer or heterophasic propylene copolymer.

6. A process as claimed in claim 1 wherein the gas phase polymerisation process takes place at a temperature of at least 60° C.

7. A process for the preparation of a copolymer of propylene and ethylene comprising:
(A) polymerising propylene and optionally ethylene in bulk to form a propylene homopolymer component or propylene-ethylene random copolymer component in the presence of a solid particulate catalyst free from an external carrier comprising:
(i) a symmetrical complex of formula (I):

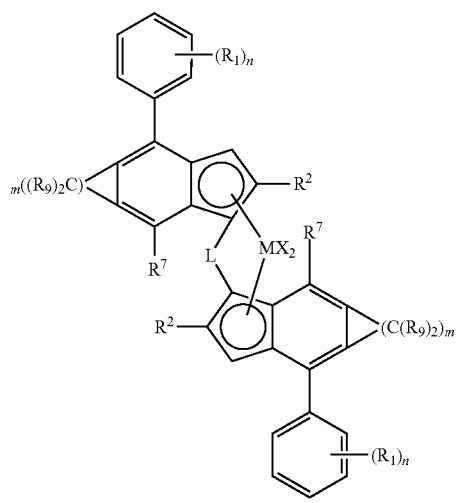

(I)

wherein
M is zirconium or hafnium;
each X is a sigma ligand;
L is a divalent bridge selected from —R'₂C—, —R'₂C—CR'₂—, —R'₂Si—, —R'₂Si—SiR'₂—, —R'₂Ge—, wherein each R' is independently a hydrogen atom, C1-C20-alkyl, tri(C1-C20-alkyl)silyl, C6-C20-aryl, C7-C20-arylalkyl or C7-C20-alkylaryl;
R² is a C1-C20 hydrocarbyl radical;
m is 2 to 5;
each R⁹ is a H or C1-C20 hydrocarbyl radical;
R⁷ is a hydrogen atom or a C₁₋₁₀-hydrocarbyl radical;
n is 0 to 3;
R¹ is a C1-C20 hydrocarbyl radical and optionally two adjacent R¹ groups taken together can form a further mono or multicyclic ring condensed to Ph ring optionally substituted by one or two groups R⁴; and
R⁴ is a C1-C10 alkyl radical;
and (ii) a cocatalyst;
(B) polymerising propylene and ethylene in the gas phase in the presence of the polymer prepared in step (A) and in the presence of the catalyst from step (A) so as to form a propylene ethylene copolymer component;
wherein the xylene soluble fraction of the copolymer of propylene and ethylene has an ethylene content of at least 10 wt % and a intrinsic viscosity of at least 1.2 dl/g.

8. A process for the preparation of a copolymer of propylene and ethylene comprising:
(A) polymerising propylene and optionally ethylene in bulk to form a propylene homopolymer component or a propylene ethylene random copolymer component in the presence of a solid particulate catalyst free from an external carrier comprising:
(i) a symmetrical complex of formula (I):

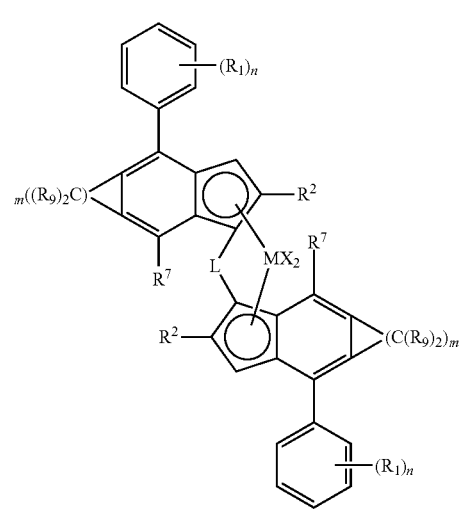

(I)

wherein
M is zirconium or hafnium;
each X is a sigma ligand;
L is a divalent bridge selected from —R'₂C—, —R'₂C—CR'₂—, —R'₂Si—, —R'₂Si—SiR'₂—, —R'₂Ge—, wherein each R' is independently a hydrogen atom, C1-C20-alkyl, tri(C1-C20-alkyl)silyl, C6-C20-aryl, C7-C20-arylalkyl or C7-C20-alkylaryl;
R² is a C1-C20 hydrocarbyl radical;

m is 2 to 5;

each $R^9$ is a H or C1-C20 hydrocarbyl radical;

$R^7$ is a hydrogen atom or a $C_{1-10}$-hydrocarbyl radical;

n is 0 to 3;

$R^1$ is a C1-C20 hydrocarbyl radical and optionally two adjacent $R^1$ groups taken together can form a further mono or multicyclic ring condensed to Ph ring optionally substituted by one or two groups $R^4$; and $R^4$ is a C1-C10 alkyl radical;

and (ii) a cocatalyst;

(B) polymerising propylene and optionally ethylene in the gas phase in the presence of the polymer prepared in step (A) and in the presence of the catalyst from step (A) so as to form a propylene homopolymer or propylene ethylene copolymer component;

(C) polymerising propylene and ethylene in the gas phase in the presence of the polymer prepared in step (B) and in the presence of the catalyst from step (B) so as to form a propylene ethylene copolymer component;

wherein the xylene soluble fraction of the copolymer of propylene and ethylene has an ethylene content of at least 10 wt % and a intrinsic viscosity of at least 1.2 dl/g.

9. A process as claimed in claim 1 wherein the xylene soluble fraction of the copolymer of propylene and ethylene has an intrinsic viscosity of at least 1.7 dl/g.

10. A process as claimed in claim 1 wherein the xylene soluble fraction of the copolymer of propylene and ethylene has an $MFR_2$ of 0.1 to 100 g/10 min.

11. A process as claimed in claim 1 wherein the xylene soluble fraction of the copolymer of propylene and ethylene has an IV(XS)>-0.032x(C2(XS))+2.82.

12. A process as claimed in claim 1 wherein the xylene soluble fraction of the copolymer of propylene and ethylene has a Charpy Impact strength at 23° C. of at least 10 kJ/m2.

13. A process as claimed in claim 1 wherein the xylene soluble fraction forms 10 to 60 wt % of the polymer.

14. A process as claimed in claim 1 wherein said complex is of formula (II)

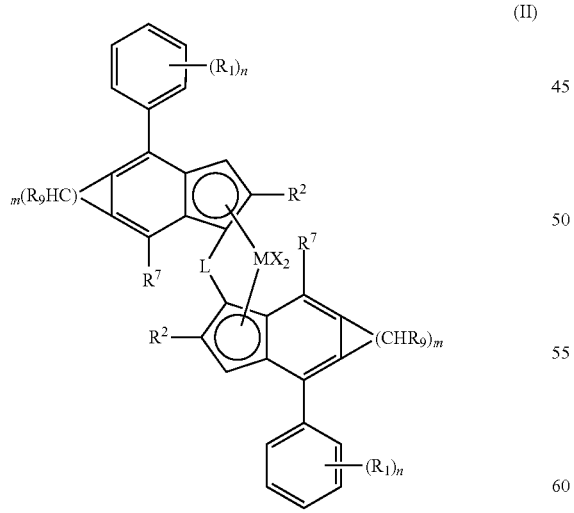

(II)

wherein

M is Zr or Hf;

each X is a hydrogen atom, benzyl, OR, a halogen atom, or an R group;

R is $C_{1-10}$ alkyl or $C_{6-10}$ aryl;

L is methylene, ethylene or $SiR^8_2$;

$R^8$ is C1-10 alkyl, $C_{6-10}$-aryl, $C_{7-12}$-alkylaryl, or $C_{7-12}$-arylalkyl;

$R^2$ is Me, $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

$R^7$ is H or $C_{1-3}$-alkyl;

n is 0 to 2; preferably 1;

each $R^1$ is $C_{1-10}$-alkyl;

each $R^9$ is H or $C_{1-10}$-alkyl;

m is 2 to 4;

and wherein the two ligands forming the complex are identical.

15. A process as claimed in claim 1 wherein said complex is of formula (III)

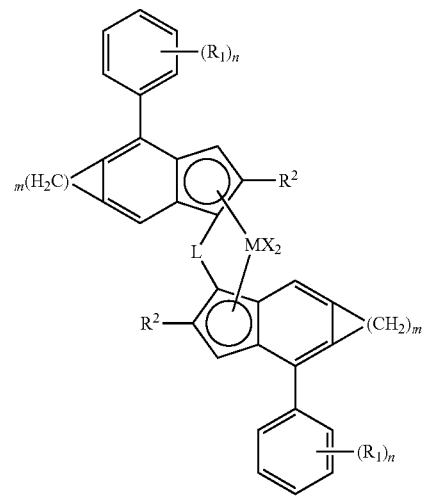

in which:

M is Zr; or Hf each $R^2$ is Me, $CH_2$-Ph, $CH_2$—$C(R^3)_{3-q}(H)_q$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;

L is $SiR^8_2$;

$R^8$ is $C_{1-8}$ alkyl;

each X is a halogen atom, methoxy, benzyl or methyl;

n is 0 or 1;

$R^1$ is $C_{1-6}$ alkyl;

m is 3 or 4;

and wherein the two ligands forming the complex are identical.

16. A process as claimed in claim 1 wherein said complex is of formula (IV)

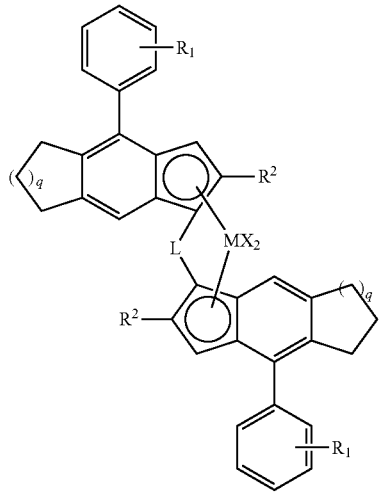

wherein L is $SiR^8_2$;
q is 1 or 2;
$R^1$ is $C_{1-6}$ alkyl;
$R^8$ is $C_{1-8}$ alkyl;
$R^2$ is Me, $CH_2$-Ph, $CH_2-C(R^3)_{3-q_3}(H)_{q_3}$ wherein $R^3$ is a $C_{1-6}$-alkyl group or together two $R^3$ groups form a $C_{3-7}$-cycloalkyl ring wherein said ring is optionally substituted by a $C_{1-6}$ alkyl group and q can be 1 or 0;
each X is a halogen atom, methoxy, benzyl or methyl;
M is Zr; or Hf;
and wherein the two ligands forming the complex are identical.

17. A process as claimed in claim 1 wherein said complex is of formula (V)

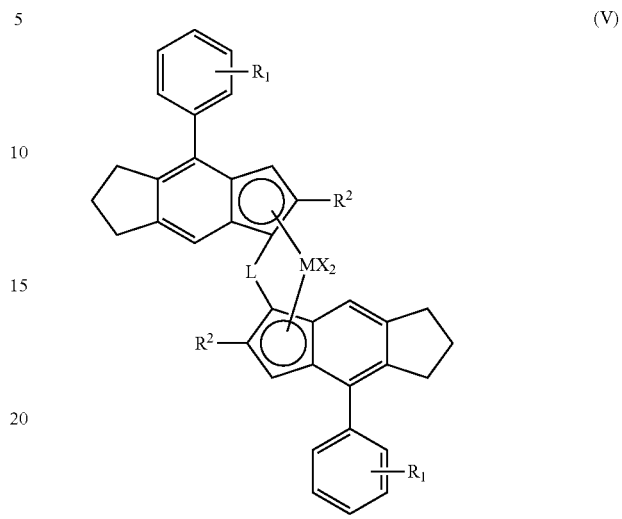

wherein L is $SiR^8_2$;
$R^8$ is $C_{1-8}$ alkyl;
$R^1$ is $C_{1-6}$ alkyl ideally at the 4-position;
$R^2$ is $C_{1-6}$ alkyl;
each X is a halogen atom, methoxy, benzyl or methyl; and
M is Zr or Hf.

18. A process as claimed in claim 1 wherein said cocatalyst comprises an organometallic compound of a Group 13 metal.

* * * * *